United States Patent

Dobouney

[15] 3,647,295

[45] Mar. 7, 1972

[54] COLOR PRINTING APPARATUS

[72] Inventor: Mouayed Edouard Dobouney, Dartford, England

[73] Assignee: Crosfield Electronics Limited, London, England

[22] Filed: May 18, 1970

[21] Appl. No.: 38,328

[30] Foreign Application Priority Data

May 23, 1969 Great Britain ....................26,508/69

[52] U.S. Cl. ..........................355/38, 178/5.2 A, 356/175, 356/176, 356/226

[51] Int. Cl. ..........................G03b 27/76

[58] Field of Search ..................355/38; 356/175, 176, 226; 178/5.2 A

[56] References Cited

UNITED STATES PATENTS 3,220,304 11/1965 Clapp ..................................355/38

3,144,510 8/1964 Farber et al. ........................355/38 X

*Primary Examiner*—Samuel S. Matthews

*Assistant Examiner*—Richard A. Wintercorn

*Attorney*—Kemon, Palmer & Estabrook

[57] ABSTRACT

In the reproduction of a colored original red, green and blue filters are used in a photoelectric scanning operation to analyze the color components of the original and corresponding electric signals are generated. To prepare a color printer representing a color which is not complementary to any of the filter colors (for example brown) the primary signals derived by means of the filters are combined in a signal-processing circuit to form further electric signals representing more restricted color ranges. These further signals are used to modify the primary signals so that the modified primary signals are less responsive to those restricted color ranges which are not required for the special color printer. Some at least of the modified primary signals are then combined in a mixer circuit to give a resultant representing the required color printer.

6 Claims, 6 Drawing Figures

Inventor
Mouayed E. Dobouney
By
Kemon, Palmer & Estabrook
Attorneys

Inventor
Mouayed E. Dobouney
By
Kemon, Palmer & Estabrook
Attorneys

Inventor
Mouayed E. Dobouney
By
Kemon, Palmer & Estabrook
Attorneys

COLOR PRINTING APPARATUS

Color printing is normally carried out by making individual black-and-white color-separation transparencies, each having density values corresponding to the values in the original of the color component which the separation represents. It is customary to produce color separations for the red, green and blue components and to use these to make color printers which are used to print images in cyan, magenta and yellow respectively, these colors being complementary to the red, blue and green of the filters. Color correction is carried out before the color printers are produced to compensate for the fact that the cyan, magenta and yellow printer inks are not complementary to the red, green and blue filters.

It is sometimes required to print the final image in an ink of a different color, for example in a brown ink. To prepare a suitable color printer, the color separation transparency is produced by a "split filter" photographic exposure. As an example, instead of giving a 20-second exposure through a red filter to make the red separation transparency (corresponding to the cyan printer), an exposure of 15 seconds through a red filter might be followed by an exposure of 5 seconds through a green filter to give a color separation transparency representing a different color.

According to the present invention, we eliminate the need for split-filter exposures to obtain a printer for an ink color which is not complementary to the red, blue or green filter, by using a method including scanning the colored original through the red, green and blue filters to cause light representative of the red, green and blue color components of successively scanned elements of the original to fall on to photosensitive means and to derive three electric signals representing the red, green and blue components, and applying selected ones of the color component signals through attenuating circuits to a mixer circuit; in the mixer circuit the signals are combined in the proportions set by the attenuating circuits, these proportions being such that the resulting signal is equivalent to the signal which would have resulted from the scanning of the colored original through a filter of a color complementary to that of the required color printer. In the preferred method according to the invention, the signal equivalent to that which would have resulted from scanning the original through a filter of a color complementary to the printer, is achieved by passing the uncorrected red, green and blue filter primary signals to a color signal processing circuit which generates signals representative of color components of the original having more restricted color ranges than the filter signals, and modifying at least some of the primary signals with the restricted range signals so that the modified primary signals are substantially unresponsive to those restricted color ranges of the original. The modified primary signals are then applied through attenuating circuits to the mixed circuits. In other words, if two of the filter color signals are added together, the resulting signal will have a rather broad color spectrum and the controls governing the restricted color ranges are set to reduce the primary signal levels in the unwanted parts of the color range.

In order that the invention may be better understood, one form of apparatus embodying the invention will now be described with reference to the accompanying drawings, in which.

Figure 1:
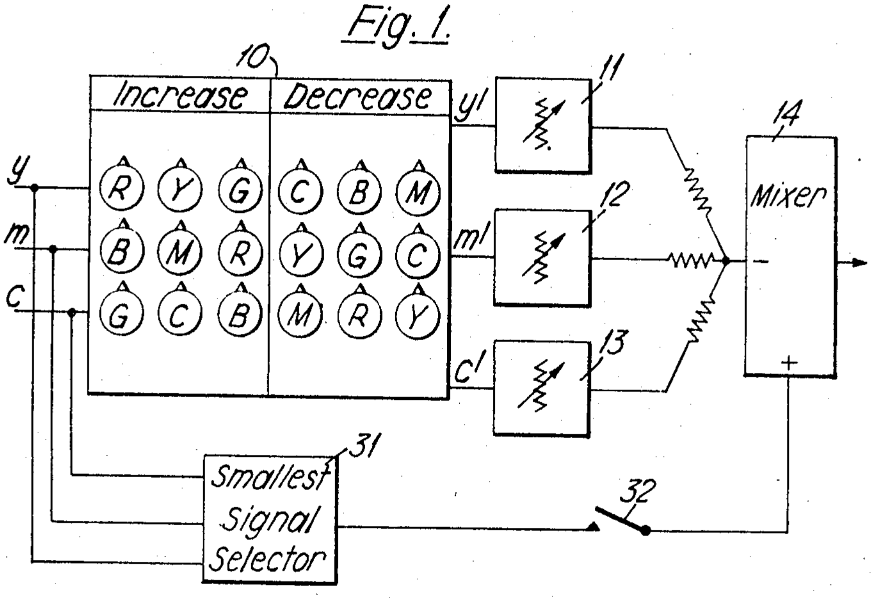
FIG. 1 is a block diagram of a circuit for generating the special color signal.

In the circuit shown in FIG. 1, the uncorrected filter separation signals *y*, *m* and *c* representing the yellow channel, magenta channel and cyan channel signals, are applied to a color correction computer 10. It will be appreciated that the signals *y*, *m* and *c* are the blue filter, green filter and red filter separation signals. The nature of the computer will be explained later and for the moment it will be sufficient to say that the computer corrects the input signals and provides at its output corrected color channel signals *y*, *m'* and *c'*, that the yellow channel of the computer has individual controls for increasing yellow in the red, yellow and green areas and for decreasing yellow in the cyan, blue and magenta areas of the original, and similar controls in the magenta and cyan channels. The corrected yellow, magenta and cyan signals are applied to individual gain-correcting circuits 11, 12 and 13 and thence to a common mixer 14 in which the signals, selectively weighted by the gain-control circuits, are added to give the required special color signal.

Figure 2A:
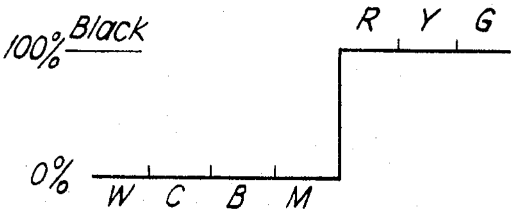
FIG. 2 are explanatory diagrams to show the effect of the controls in the color signal processing apparatus of FIG. 1.
Figure 2B:
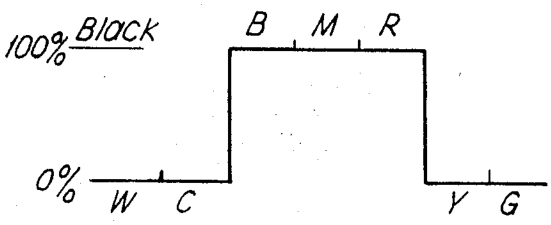
Figure 2C:
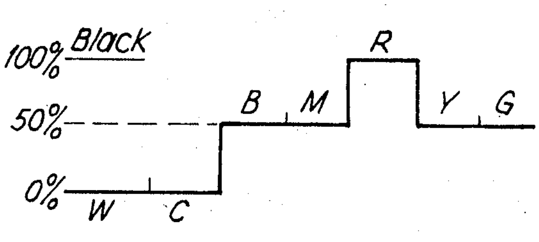

A simple example to illustrate the theory of the special color signal will now be described with reference to FIGS. 2*a*, 2*b* and 2*c*. Assume that the color analyzer which provides the separation signals is scanning a color patch which consists of the following: white, cyan, blue, magenta, red, yellow and green, represented by W, C, B, M, R, Y and G. Scanning a black patch would provide a signal at the 100 percent level and scanning the white patch provides a signal at the 0 percent level. FIG. 2*a* shows the output of the corrected yellow channel. The analyzer provides a white level signal when cyan, blue and magenta are scanned through the blue filter and a black level signal when red, yellow and green are scanned. The output of the magenta channel of the color analyzer is shown in FIG. 2*b*. In this case the cyan, yellow and green patches give a white level signal when scanned through the green filter and the blue, magenta and red patches give a black level signal.

Suppose that we now mix 50 percent of the yellow channel signal with 50 percent of the magenta channel signal, with no cyan component. Then from FIGS. 2*a* and 2*b* it will be seen that the output of the special ink printer is that shown in FIG. 2*c*. Only the red patch now gives a black-level signal. Blue, magenta, yellow and green give 50 percent signals. If the special color required is red, the controls in the yellow and magenta channels can be used to reduce the blue, magenta, yellow and green signal outputs towards zero, leaving only red at the black level; it will be appreciated that the red will also print in the black area.

The example given above (deriving a "red" signal) is a simple one chosen for the purpose of illustrating the principle. However, the principle of adding together filter signals and using the restricted-color controls to reduce signal components representing unwanted colors, also applies to the derivation of a "brown" signal, for example.

Figure 3:
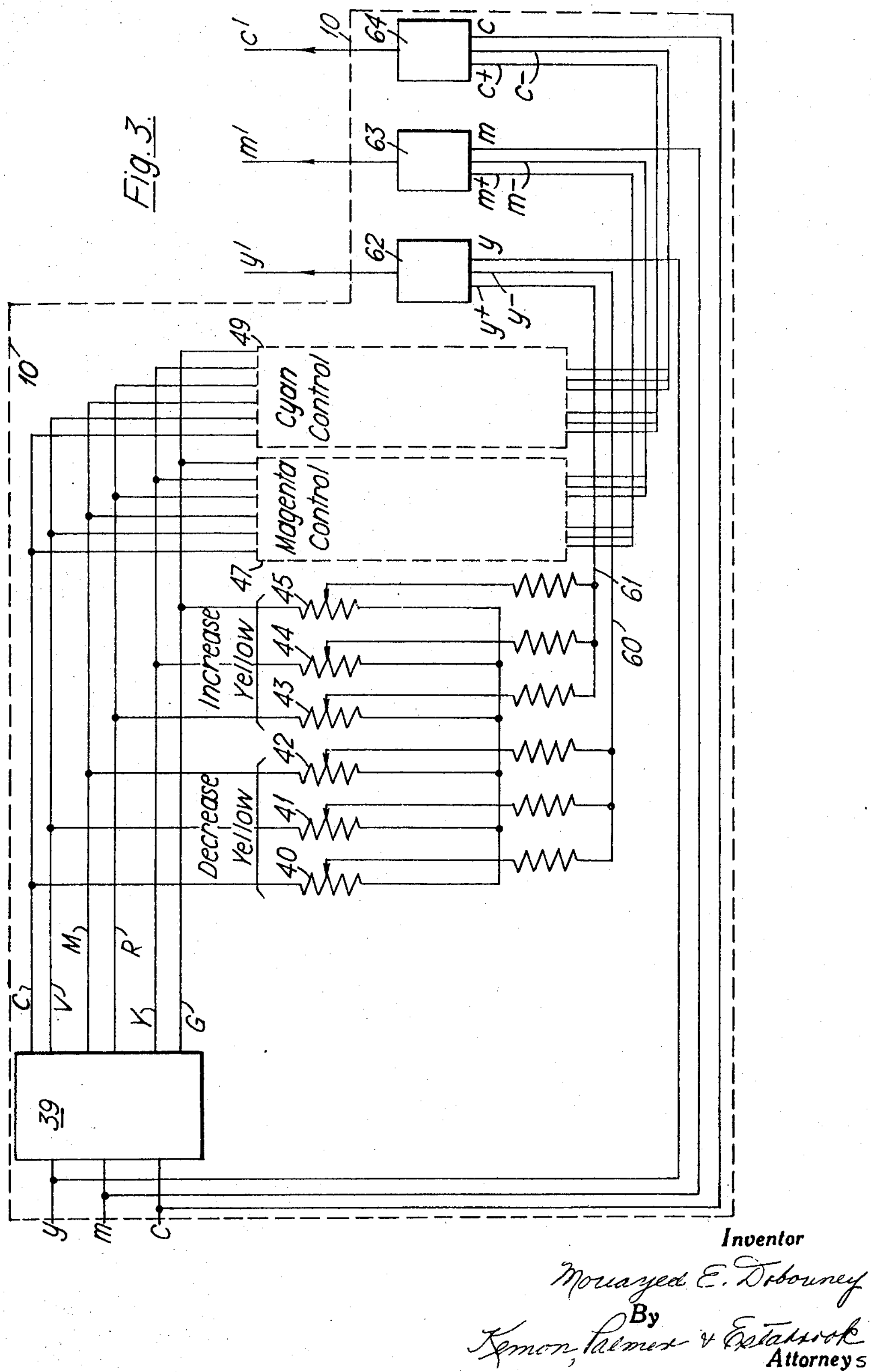
FIG. 3 shows diagrammatically the color correction computer.

The color correction computer 10 is of the kind described in out U.S. Application Ser. No. 876,497. This computer is represented briefly in FIG. 3. The yellow, magenta and cyan signals are applied to adding and subtracting circuits contained in the block 39 and these circuits, details of which will be found in the above-mentioned specification, provide outputs representing the cyan, magenta, red, yellow and green components of the original. Thus, from the original broad-spectrum colors there have been derived a larger number of colors representing more restricted color ranges. For each of the printer colors, connections are taken from the six outputs of the block 39 selectively to six potentiometers. Thus, for the yellow channel connections are taken from the six outputs to the potentiometers 40 to 45. There is a similar series of six potentiometers in the magenta control unit 47 and a further series of six potentiometers in the cyan control unit 49. The three potentiometers 40, 41 and 42 have a common connection 60 to a yellow channel adder 62. The three potentiometers 43, 44 and 45 have a common connection 61 to the same yellow channel adder 62, and this latter circuit also receives the uncorrected yellow signal. Adjustment of the potentiometer 40 in a clockwise direction will tend to decrease any yellow component in cyan areas, and clockwise adjustment of potentiometers 41 and 42 similarly tends to decrease yellow in blue and magenta areas. In a similar manner, clockwise adjustment of potentiometers 43, 44 and 45 increases the yellow signal component in signals corresponding to red, yellow and green areas. The only difference for the magenta channel is that in this case the three potentiometers connected to the cyan, yellow and green input lines are arranged so that clockwise rotation decreases the magenta in these areas and the three potentiometers connected to the blue, red and magenta input line boost the magenta signal corresponding to areas of these colors when they are given a clockwise rotation. The potentiometers in the cyan control unit are arranged in an analogous manner. The magenta adder has one input representing the uncorrected magenta channel, one input connected in common to the three "increased magenta" potentiometers and one input connected in common to the three "-decreased magenta" potentiometers. There are three similar connections for the cyan adder.

Thus, the corrected yellow, magenta and cyan signals from the adder circuits 62, 63 and 64 respond to the controls 40 to 45 and the similar controls in the units 47 and 49 so that, for example, the yellow signal can be decreased whenever it represents a yellow component of a blue, magenta, yellow or green area. With these controls in combination with the mixer circuit a brown signal (for example) can be selected; this signal will be substantially equivalent to the signal which would have resulted from the scanning of the colored original through a filter of a color complementary to red. Referring back to FIG. 1, the controls shown in the color correction computer correspond to the potentiometers of FIG. 3.

Figure 4:
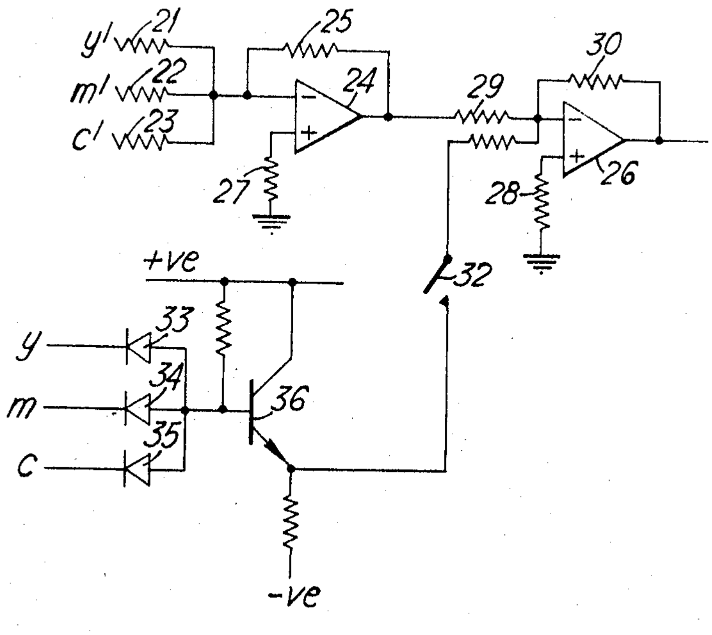
FIG. 4 is a diagram of the mixer circuit and smallest signal selector circuit.

The mixer circuit is shown in FIG. 4. The corrected yellow, magenta and cyan signals are applied through resistors 21, 22 and 23 to a common input terminal of an amplifier 24 having a feedback resistor 25 from its output to the common input terminal. This input terminal thus constitutes a virtual earth at the summing point. In the circuit shown a second amplifier 26 is used in series with the amplifier 24. The two amplifiers thus produce a double inversion and act together as a noninverting amplifier. Resistors 27 and 28 compensate for offset current, 27 being equal to the parallel sum of the resistors 25, 21, 22 and 23; and 28 being equal to the parallel sum of resistors 29 and 30.

The ratio of the feedback resistor 25 to resistor 21 sets the percentage of the corrected yellow signal which appears in the output. Similarly, the ratio of resistor 25 to resistor 22 sets the percentage of the magenta signal in the output and the percentage of cyan is set by the ratio of resistor 25 to resistor 23.

In FIG. 1, there is shown a smallest-signal selector 31 having inputs connected to the uncorrected yellow, magenta and cyan lines. This smallest signal selector circuit normally provides an "undercolor" signal which is used when a black printer is employed in addition to the three color printers. In areas in which the black printer is effective, the yellow, magenta and cyan printers must be reduced to the extent that they would have contributed to provide the black now provided by the black printer. Since with balanced inks the black is provided equally by the yellow, magenta and cyan inks, the smallest signal represents the extent to which each signal contributes to black. Consequently, an amount corresponding to this smallest signal is subtracted from each of the color channels. FIG. 1 shows a switch 32 in the path of the output of the smallest signal selector circuit. This enables the undercolor removal signal to be applied or not applied to the mixer. When the switch is closed there is a 100 percent undercolor removal, that is to say no special ink is printed in black areas or heavy near-neutral areas. A decision as to whether undercolor removal is used or not is made before the color controls are adjusted. The smallest signal selector circuit is shown in FIG. 4 and consists simply of the three diodes 33, 34 and 35 and the transistor 36.

The invention eliminates the hand retouching which is required when the split-filter technique is used. This is because in a method embodying the present invention corrected color separation signals are employed. The simplification permitted by the invention can be appreciated by considering the printing of a biscuit package. The biscuit color can be reproduced very satisfactorily using yellow, light brown and dark brown inks. In the method employing the split-filter technique the light brown could be produced by an 80 percent green filter exposure followed by a 20 percent red filter exposure, followed by hand retouching. The dark brown might require 30 percent green filter exposure and 70 percent red filter exposure, again with hand retouching. The yellow printer would be derived in the usual way from a blue filter exposure, again together with hand retouching is eliminated, the removal of the unwanted "tones" being carried out electronically under the control of the above-described color controls.

I claim:

1. In a method of reproducing a colored original by analyzing the color components of the original using red, green and blue filters, the preparation of a color component printer representing a color which is not complementary to the red, blue or green filter by:

scanning the colored original through the said red, green and blue filters to cause light representative of the red, green and blue components of successively scanned elements of the original to fall on to photosensitive means and to derive from the photosensitive means three electric signals representing the said red, green and blue components;

applying at least two of said signals to a correcting circuit such that the range of color represented by each corrected signal from said circuit is more limited than that represented by the corresponding uncorrected signal applied to said circuit;

and applying selected ones of the corrected color component signals through gain-control circuits to a mixer circuit in which the signals are combined in the proportions set by the gain-control circuits, whereby the resulting signal is equivalent to that which would have resulted from the scanning of the colored original through a filter of a color complementary to that of the required color printer.

2. In a method of reproducing a colored original by analyzing the color components of the original using red, green and blue filters, the preparation of a color component printer representing a color which is not complementary to the red, green or blue filter by:

scanning the colored original through the said red, green and blue filters to cause light representative of the red, green and blue components of successively scanned elements of the original to fall on to photosensitive means and deriving from the photosensitive means primary signals representing the red, green and blue components of the original;

selectively combining the primary signals in a color signal processing circuit to derive therein signals representative of more restricted color ranges of the original;

modifying at least some of the primary signals with selected ones of the restricted-range signals so that the modified primary signals are substantially unresponsive to those restricted color ranges of the original;

and applying selected ones of the modified primary signals through gain-control circuits to a mixer circuit in which the said selected signals are combined in the proportions set by the gain-control circuits, whereby the resulting signal at the mixer output is substantially equivalent to the signal which would have resulted from the scanning of the colored original through a filter of a color complementary to that of the required color printer.

3. In apparatus for making color printer from a colored original, using red, green and blue filters to analyze the color components of the original, means for making a color printer representing a color which is not complementary to any of the filter colors, the said means comprising:

photoelectric scanning means for scanning the original through the said filters to generate primary signals representing red, green and blue color components of the original;

signal processing means selectively combining the said primary signals to generate further electric signals representing color components of restricted color range;

control means for modifying the primary signals in accordance with the said restricted color-range signals;

a mixer circuit for combining at least two of the modified primary signals;

and gain-control means for adjusting the relative proportions of the combined signals so that the output of the mixer circuit constitutes the required printer signal.

4. Apparatus in accordance with claim 3, in which the signal processing means receiving the primary signals representing the cyan, magenta and yellow inks generate restricted color-range signals representing the colors given by the overprints of pairs of these inks, and in which the control means includes for each of the cyan, magenta and yellow ink channels attenuating controls for each of the said overprint colors, whereby the response of the primary signals to the said overprint colors can be attenuated.

5. Apparatus in accordance with claim 3, including inhibiting means for preventing the required color printer from printing in areas corresponding to black areas of the original.

6. Apparatus in accordance with claim 5, in which the inhibiting means includes a circuit for selecting the primary signal whose instantaneous value is nearest to black level, and means for subtracting the selected signal from the signal representing the required color printer.

* * * * *